United States Patent Office 3,772,249
Patented Nov. 13, 1973

3,772,249
FILLED POLYTETRAFLUOROETHYLENE COMPOSITIONS
David Evan Bryan Morgans, Hatfield, England, assignor to Imperial Chemical Industries Limited, London, England
No Drawing. Filed Sept. 14, 1971, Ser. No. 180,451
Claims priority, application Great Britain, Oct. 5, 1970, 47,150/70
Int. Cl. C08f 45/04
U.S. Cl. 260—41 B                     5 Claims

ABSTRACT OF THE DISCLOSURE

Filled PTFE compositions are made by mixing one or more fillers with a degraded PTFE and then adding this mixture to an aqueous dispersion of PTFE and effecting coagulation of the PTFE dispersion.

---

This invention relates to filled polytetrafluoroethylene compositions and to a method of making such compositions. Polytetrafluoroethylene will hereinafter be referred to as PTFE which term includes polymers of tetrafluoroethylene and copolymers of tetrafluoroethylene and minor amounts of other monomers.

Compositions comprising PTFE and one or more fillers in admixture are known as filled PTFE compositions or simply filled PTFE and are of use in the production of bearings. One method of making filled PTFE compositions suitable for this purpose is by coagulation of a dispersion of PTFE on to a metal filler. The coagulated PTFE and filler settle to the bottom of the vessel in which the dispersion has been placed, and the coagulum has then to be separated from the remaining liquid. It is found when working such a process on a relatively large scale that difficulties arise because of the relatively large volumes of dispersion which have to be used to make a given volume of filled polymer. Thus it would be desirable to increase the amount of filled composition which can be obtained by use of a mixing vessel of a given size.

British patent specification No. 917,223 describes a method of making a filled PTFE composition including the step of mixing the fillers with a dispersion of PTFE and coagulating the PTFE. It is stated that the fillers are added in the form of dry powders to a dispersion of PTFE in water, and if available, finely ground unsintered PTFE scrap is also added. No examples of the use of unsintered PTFE scrap are given and it is thought that unsintered scrap as normally understood would not disperse well in the PTFE dispersion and so does not commend itself for use in a process of coagulating PTFE and a fillter together. We have found, however, that by adding to a PTFE dispersion a mixture of a filler and a lubricant powder grade of PTFE, as defined below, (which is a sintered material) and coagulating the dispersion, it is possible to obtain compositions in which the filler and lubricant grade of PTFE are well dispersed with the PTFE from the dispersion, and from a given volume of mix to increase the solids content obtained by coagulation.

According to this invention there is provided a process for the manufacture of a filled PTFE composition comprising adding to an aqueous dispersion of PTFE one or more fillers in powder form and a lubricant powder grade of PTFE as defined below and thereafter effecting coagulation of the aqueous dispersion of PTFE, the weight of the lubricant powder grade of PTFE from 5 to 400% by weight of the PTFE in the aqueous dispersion. Preferably, the filler or fillers in powder form are mixed with the lubricant powder grade of PTFE prior to addition to the dispersion. They may be dry mixed or mixed as a slurry and added to the dispersion.

The invention also provides a filled PTFE composition comprising one or more fillers in powder form, a lubricant powder grade of PTFE as above defined and PTFE particles of colloidal size coagulated therewith.

By the term lubricant powder grade of PTFE we mean a PTFE powder of average particle size of less than 20 $\mu$m. (as measured optically) that has been prepared by degradation and comminution of a high molecular weight PTFE until its melt viscosity at 380° C. is less than $10^6$ poise. The high molecular weight PTFE used to make the dry lubricant powder may be a granular or coagulated dispersion grade of PTFE and may be degraded by thermal treatment or by irradiation. An example of a commercially available dry lubricant powder is Fluon L169 obtainable from Imperial Chemical Industries Limited. Fluon L169 has a melt viscosity at 380° C. of the order of $4 \times 10^5$ poise and an average particle size of the order of 5 $\mu$m. Fluon is a registered trademark.

Examples of fillers that may be used include metal powders, such as copper, lead and bronze, oxides of such metals; graphite; coke flour; glass fibres; molybdenum disulphide; and organic fillers such as polyimides. The amount of filler that is used will of course depend on the intended application of the composition. Normally the total amount of filler will be within the range of from 5 to 40% by volume of the composition.

The amount of dry lubricant powder that is used may vary between 5 to 400% by weight of the PTFE in the aqueous dispersion. In particular we prefer that the amount of dry lubricant powder is from 100 to 350% by weight of the weight of the PTFE in the aqueous dispersion. Increasing the amount of dry lubricant powder substantially above this level, i.e. to above 400% by weight, tends to give rise to products in which the dispersion of the dry lubricant powder throughout the composition is poor.

The aqueous dispersion of PTFE preferably has a solids content of from 10 to 40% by weight. More concentrated dispersions, for example Fluon GP1, tend to be too heavily stabilised to permit coagulation to be readily effected. PTFE dispersions as made, i.e. ex-autoclave, optionally with the addition of a small amount of a non-ionic surface active agent in order to stabilise the dispersion sufficiently to permit storage and transportation, are to be preferred. Particularly suitable dispersions are those containing less than 1% by weight, based on the weight of the PTFE in the dispersion, of a non-ionic surface active agent such as a polyoxyethylated p-octyl phenol containing from 9 to 10 moles of ethylene oxide per mole of p-octyl phenol.

In some cases it is desirable to incorporate into the composition a small amount of an organic liquid wetting material such as a hydrocarbon such as toluene, p-xylene, tetralin, decalin, or an alcohol such as ethanol, as described in British Pat. 837,198, in order to improve the dispersion of the filler and dry lubricant powder in the aqueous dispersion. The amount of organic liquid wetting agent is preferably within the range of from 1 to 10% by weight of the aqueous dispersion.

Coagulation may be effected by the addition of a small amount of an electrolyte, for example an aqueous solution of aluminum nitrate, or in some cases, agitation of the mixture may be sufficient to effect coagulation.

The invention is illustrated by the following examples in which all percentages are expressed by weight.

EXAMPLE 1

450 ml. of an aqueous PTFE dispersion containing 90 g. of PTFE was placed in a beaker with 1 ml. of a surface active agent comprising a 10% solution of a polyoxyethylated p-octyl phenol containing from 9 to 10 moles of ethylene oxide per mole of p-octyl phenol, and 24 ml. of toluene. 90 g. of a dry lubricant powder (Fluon L169) was added to the beaker with stirring followed by 120 g. of bronze powder. The mixture coagulated without addition of electrolyte and after decanting the water from the coagulum and drying gave a composition which was quite good in quality but in which the dispersion of the bronze in the PTFE was imperfect.

EXAMPLE 2

Example 1 was repeated but mixing the 90 g. of Fluon L169 and the 120 g. of bronze together before addition to the mixture of the aqueous dispersion of PTFE, non-ionic surface active agent, and toluene. 2 g. of aluminum nitrate as a solution in water were added to effect coagulation. The dispersion of filler in the mixture was good and, after removing the water, the resultant mixture was cohesive but not sticky and was eminently suitable for moulding into bearings.

EXAMPLE 3

Example 2 was repeated but using 180 g. of Fluon L169 and 180 g. of bronze powder. The properties of the resultant mixture were very similar to those of Example 2.

EXAMPLE 4

Example 3 was repeated but replacing the 180 g. of Fluon L 169 by 360 g. of Fluon L169 and the 240 g. of bronze powder by 300 g. of bronze powder. On addition to the aqueous dispersion of PTFE, coagulation was effected merely by stirring, the addition of aluminum nitrate being unnecessary. The product was similar to that of Examples 2 and 3.

EXAMPLE 5

450 ml. of an aqueous PTFE dispersion containing 90 grams of PTFE was placed in a mixing vessel with 1 ml. of a 10% solution of polyoxyethylated p-octyl phenol containing from 9 to 10 moles of ethylene oxide per mole of p-octyl phenol, and 24 ml. of toluene. 90 grams of Fluon L169 and 100 grams of lead powder were blended together to form a dry mixture and the dry mixture was added to the dispersion. Aluminum nitrate solution was added to cause coagulation. A precipitate formed which, after removing the water, was found to be of good colour and of a crumbly nature suitable for moulding into bearings.

EXAMPLE 6

The procedure of Example 5 was repeated using the same quantities of PTFE dispersion, surface active agent and toluene, but doubling the weights of Fluon L169 and lead powder. The filled composition obtained was of firm dark consistency of excellent quality.

EXAMPLE 7

The procedure of Example 5 was repeated but this time using four times the respective weights of Fluon L169 and lead powder. After a little difficulty in effecting dispersion, a good dark material was made. It was observed after 72 hours that slight darkening in patches occurred, possibly due to lead separation.

EXAMPLE 8

The procedure of Example 2 was repeated but using 120 grams of mica powder in place of the bronze powder. The mica was easier to dry mix with the Fluon L169 but the precipitate took longer to separate after coagulation. After removal of water, the texture of the composition was good.

I claim:
1. A process for the manufacture of a filled PTFE composition comprising adding to an aqueous dispersion of PTFE at least one filler in powder form and a lubricant powder grade of PTFE, that is, a PTFE powder of average particle size of less than 20 μm. (as measured optically) that has been prepared by degradation and comminution of a high molecular weight PTFE until its melt viscosity at 380° C. is less than $10^6$ poise, and thereafter effecting coagulation of the aqueous dispersion of PTFE, the weight of the lubricant powder grade of PTFE being from 5 to 400% by weight of the PTFE in the aqueous dispersion.

2. A process according to claim 1 wherein the filler or fillers are dry mixed with the lubricant powder grade of PTFE prior to addition to the aqueous dispersion of the PTFE.

3. A process according to claim 2 wherein the filler is a metal powder.

4. A process according to claim 1 wherein the amount of dry lubricant powder grade of PTFE is from 100 to 350% by weight of the weight of the PTFE in the aqueous dispersion.

5. A process according to claim 1 wherein the aqueous dispersion of PTFE has a solids content of from 10 to 40% by weight.

References Cited

UNITED STATES PATENTS

| | | | |
|---|---|---|---|
| 3,409,584 | 11/1968 | Bushman et al. | 260—41 |
| 2,718,452 | 9/1955 | Lantz | 18—54 |
| 2,559,752 | 7/1951 | Berry | 260—29.6 |
| 3,080,258 | 4/1963 | Davis | 717—100 |
| 2,806,256 | 9/1957 | Smith | 18—57 |
| 2,824,060 | 2/1958 | White | 252—12.2 |
| 3,287,288 | 11/1966 | Reiting | 260—4 |

RICHARD ZAITLEN, Assistant Examiner

MORRIS LIEBMAN, Primary Examiner

U.S. Cl. X.R.

260—296 F, 41 A, 900